(12) United States Patent
Huo et al.

(10) Patent No.: US 12,597,810 B2
(45) Date of Patent: Apr. 7, 2026

(54) METHOD AND DEVICE FOR DETECTING FOREIGN MATTER, HOUSEHOLD APPLIANCE AND AIR CONDITIONING SYSTEM

(71) Applicants:FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

(72) Inventors: Zhaojing Huo, Foshan (CN); Jianbin Zhang, Foshan (CN); Jinqing Xu, Foshan (CN); Ming Li, Foshan (CN); Chang'an Cen, Foshan (CN)

(73) Assignees: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 18/782,691

(22) Filed: Jul. 24, 2024

(65) Prior Publication Data

US 2024/0380251 A1 Nov. 14, 2024

Related U.S. Application Data

(63) Continuation of application No. PCT/CN2022/101707, filed on Jun. 28, 2022.

(30) Foreign Application Priority Data

Jan. 24, 2022 (CN) .......................... 202210079744.1

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02); *H02J 2310/14* (2020.01)

(58) Field of Classification Search
CPC ........ H02J 50/60; H02J 50/12; H02J 2310/14; H02J 50/10; Y02T 10/70; Y02T 10/7072; H02M 3/335; H02M 1/088; H02M 3/3353
See application file for complete search history.

(56) References Cited

U.S. PATENT DOCUMENTS

2013/0134797 A1* 5/2013 Kanno .................... H01F 38/14
307/104
2019/0097471 A1* 3/2019 Pantic ..................... H02J 50/12
2022/0231547 A1* 7/2022 Wu ........................ H02J 50/005

* cited by examiner

*Primary Examiner* — Lincoln D Donovan
*Assistant Examiner* — Alex W Lam
(74) *Attorney, Agent, or Firm* — Scully, Scott, Murphy & Presser, P.C.

(57) ABSTRACT

A method and device for detecting a foreign matter for a wireless power transmission system, a household appliance and an air conditioning system are provided. The wireless power transmission system includes a transmitting end and a receiving end. The receiving end includes a receiving detection coil and a receiving work coil, and a mutual inductance corresponding to the receiving detection coil is greater than a mutual inductance corresponding to the receiving work coil. The method includes: controlling the transmitting detection coil of the transmitting end to send an electric energy to the receiving end and obtaining a transmitting power of the transmitting end; obtaining a receiving power when the receiving end receives the electric energy transmitted by the transmitting end; obtaining a result of a (Continued)

foreign matter detection based on the transmitting power and the receiving power.

12 Claims, 4 Drawing Sheets

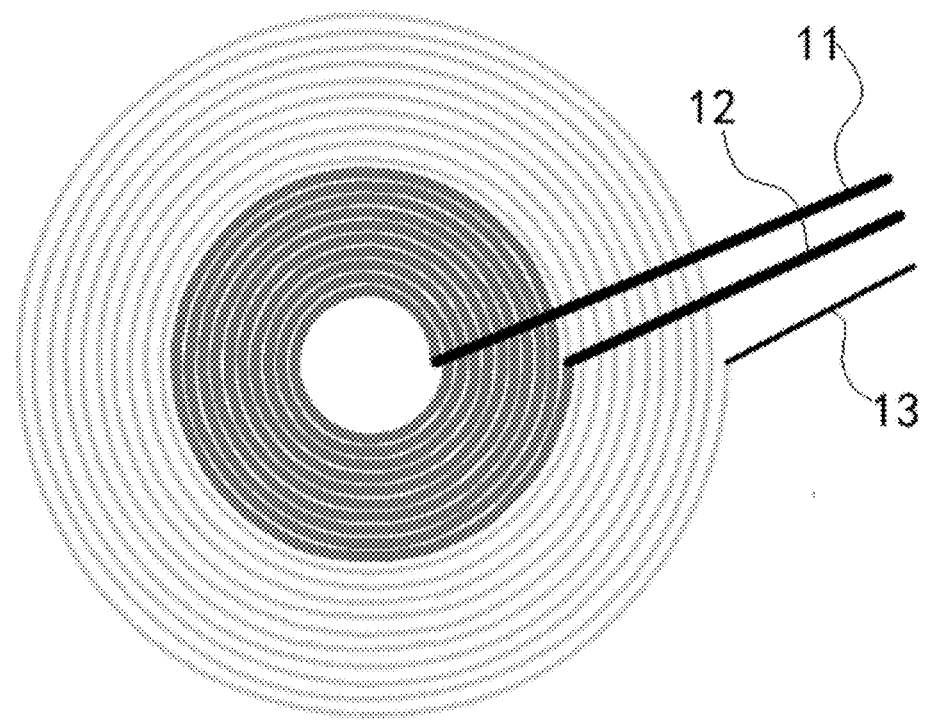

FIG. 3

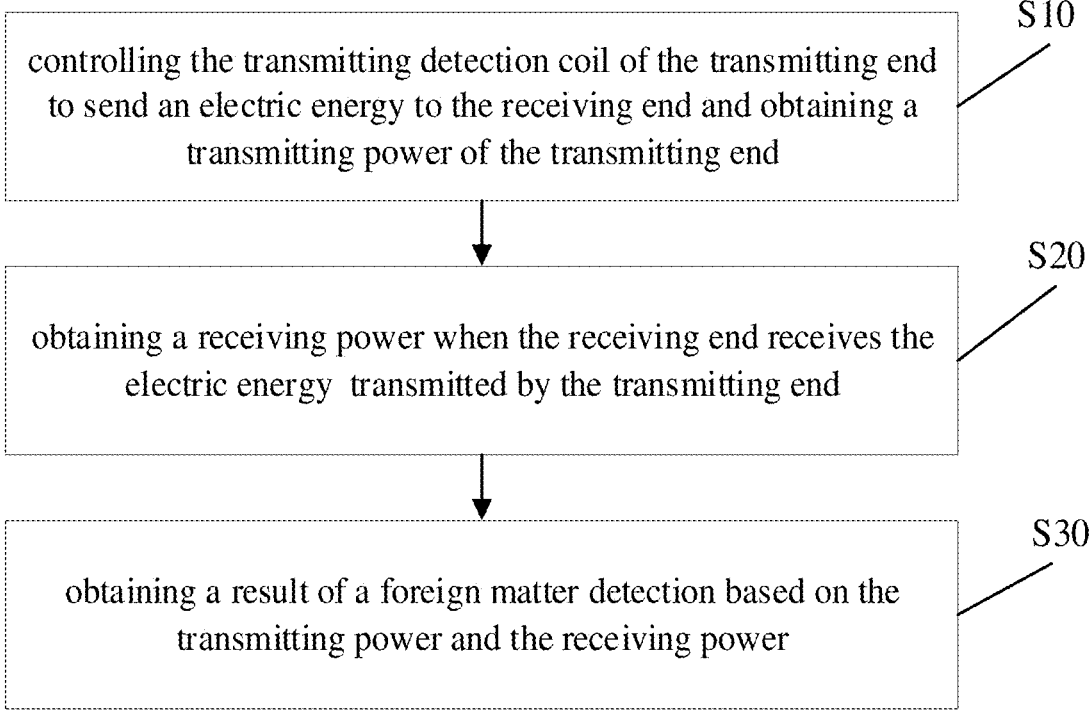

S10 controlling the transmitting detection coil of the transmitting end to send an electric energy to the receiving end and obtaining a transmitting power of the transmitting end

S20 obtaining a receiving power when the receiving end receives the electric energy transmitted by the transmitting end

S30 obtaining a result of a foreign matter detection based on the transmitting power and the receiving power

FIG. 4

Curve of relation for an output power, a transmission efficiency
and a coefficient of a mutual inductance

300

Sending adjustment module — 301

Power acquisition module — 302

Foreign matter detection module — 303

METHOD AND DEVICE FOR DETECTING FOREIGN MATTER, HOUSEHOLD APPLIANCE AND AIR CONDITIONING SYSTEM

CROSS-REFERENCE TO RELATED APPLICATIONS

This application is a continuation application of PCT International Patent Application No. PCT/CN2022/101707 filed on Jun. 28, 2022, which claims priority to and benefits of Chinese Patent Application No. 202210079744.1, filed on Jan. 24, 2022, the entire contents of each of which are hereby incorporated by reference for all purposes. No new matter has been introduced.

FIELD

The disclosure relates to the field of wireless power transmission, and in particular to a method and device for detecting a foreign matter for a wireless power transmission system, a household appliance, and an air conditioning system.

BACKGROUND

At present, wireless power transmission technology is more widely used in various electronic products and electrical apparatuses, because contact points are not required to be exposed during transmission and thus it is more convenient to use. The wireless power transmission technology can currently be divided into a low-power wireless transmission and a high-power wireless transmission. For a high-power wireless power transmission, it is currently required to use cameras, a thermal imaging apparatus and so on to detect foreign matters between coils. These detection methods, because of requiring the use of additional devices or apparatuses, are not suitable for applying in portable mobile apparatus. Therefore, there is an urgent need for a method or device for detecting a metal foreign matter that can be applied in a scenario of the high-power wireless power transmission.

SUMMARY

The purpose of the disclosure is at least in part to provide a method and device for detecting a foreign matte for a wireless power transmission system, a wireless power transmission apparatus, a household appliance and an air conditioning system, which can be effectively applied to a detection of a small metal foreign matters in a scenario of a high-power wireless power transmission and have a high accuracy of a foreign matter detection.

In a first aspect, the disclosure provides a method for detecting a foreign matter for a wireless power transmission system. The wireless power transmission system includes a transmitting end and a receiving end. The receiving end includes a receiving detection coil and a receiving work coil, and a mutual inductance corresponding to the receiving detection coil is greater than a mutual inductance corresponding to the receiving work coil. The method includes: controlling the transmitting detection coil of the transmitting end to send electric energy to the receiving end and obtaining a transmitting power of the transmitting end; obtaining a receiving power when the receiving end receives the electric energy transmitted by the transmitting end; obtaining a result of a foreign matter detection based on the transmitting power and the receiving power.

In a second aspect, the disclosure provides a device for detecting a foreign matter of a wireless power transmission system. The wireless power transmission system includes a transmitting end and a receiving end. The transmitting end includes a transmitting detection coil and a transmitting work coil. A mutual inductance corresponding to the transmitting detection coil is greater than a mutual inductance corresponding to the transmitting work coil. The device for detecting a foreign matter includes: a sending adjustment module, configured to control the transmitting detection coil of the transmitting end to send electric energy to the receiving end and obtain a transmitting power of the transmitting end; a power acquisition module, configured to obtain a receiving power when the receiving end receives the electric energy transmitted by the transmitting end; a foreign matter detection module, configured to obtain a result of a foreign matter detection based on the transmitting power and the receiving power.

In a third aspect, the disclosure provides a wireless power transmission apparatus, including: a transmitting end configured to wirelessly transmit electric energy, a processor and a memory. The transmitting end includes a transmitting detection coil and a transmitting work coil. A mutual inductance corresponding to the transmitting detection coil is greater than a mutual inductance corresponding to the transmitting work coil. The memory is coupled to the processor, and the memory stores instructions. The instructions, when executed by the processor, cause the wireless power transmission apparatus to implement steps of any one of the methods described in the first aspect above.

In a fourth aspect, a method for detecting a foreign matter for a wireless power transmission system is also provided. The wireless power transmission system includes a transmitting end and a receiving end. The receiving end includes a receiving detection coil and a receiving work coil, and a mutual inductance corresponding to the receiving detection coil is greater than a mutual inductance corresponding to the receiving work coil. The method includes: controlling the receiving detection coil of the receiving end to receive electric energy transmitted by the transmitting end and obtaining a receiving power; obtaining a transmitting power when the transmitting end sends the electric energy; and obtaining a result of a foreign matter detection based on the transmitting power and the receiving power.

In a fifth aspect, the disclosure provides a household appliance, including: a receiving end configured to wirelessly receive electric energy, a processor and a memory, the receiving end comprising a receiving detection coil and a receiving work coil, a mutual inductance corresponding to the receiving detection coil being greater than a mutual inductance corresponding to the receiving work coil. The memory is coupled to the processor, and the memory stores instructions, the instructions, when executed by the processor, cause the wireless power transmission apparatus to implement: controlling the transmitting detection coil of the transmitting end to send electric energy to the receiving end and obtaining a transmitting power of the transmitting end; obtaining a receiving power when the receiving end receives the electric energy transmitted by the transmitting end; and obtaining a result of a foreign matter detection based on the transmitting power and the receiving power.

In a sixth aspect, the disclosure provides an air conditioning system, including: a wireless charger and an air conditioner. The wireless charger comprises: a transmitting end configured to wirelessly transmit electric energy. The air conditioner comprises a receiving end configured to wirelessly receive the electric energy. The air conditioning system is configured to perform any of the methods described in the first aspect above.

BRIEF DESCRIPTION OF DRAWINGS

In order to more clearly illustrate the technical solutions in the embodiments of the disclosure, the accompanying drawings required for use in the description of the embodiments will be briefly introduced in the following. Obviously, the accompanying drawings described below are some embodiments of the disclosure. For those skilled in the art, other accompanying drawings can be obtained based on these drawings without creative work.

FIG. 3 is a schematic structural diagram of a first coil according to one or more embodiments of the disclosure;

FIG. 4 is a flow chart of a method for detecting a foreign matter for a wireless power transmission system according to one or more embodiments of the disclosure;

DESCRIPTION OF EMBODIMENTS

In order to make the purpose, technical solutions and advantages of the disclosure clearer, the technical solutions in embodiments of the disclosure will be described clearly and completely below in conjunction with the accompanying drawings in the embodiments of the disclosure. Obviously, the described embodiments are only some embodiments of the disclosure, rather than all embodiments of the disclosure. Based on the embodiments of the disclosure, all other embodiments obtained by those skilled in the art without making any creative work shall fall within the scope sought by the disclosure.

According to some embodiments of the disclosure, a method for detecting a foreign matter for a wireless power transmission system is provided. The method can be applied to perform a foreign matter detection on the wireless power transmission system. The wireless power transmission system includes a transmitting end and a receiving end. In an embodiment, the transmitting end may be disposed in a wireless charger, and the receiving end may be disposed in a power consumption device such as a mobile phone, a computer, a household appliance and so on. Thus, the transmitting end in the wireless charger and the receiving end in the power consumption device constitutes the wireless power transmission system.

Figure 1:
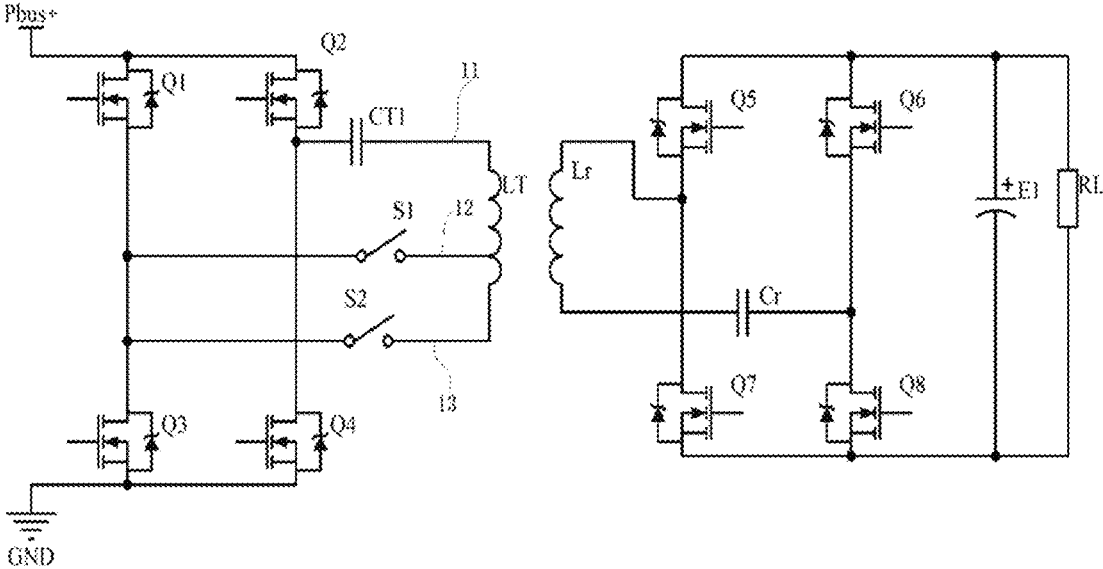
FIG. 1 is a structural schematic diagram of a partial circuit of a wireless power transmission system according to one or more embodiments of the disclosure.
Figure 2:
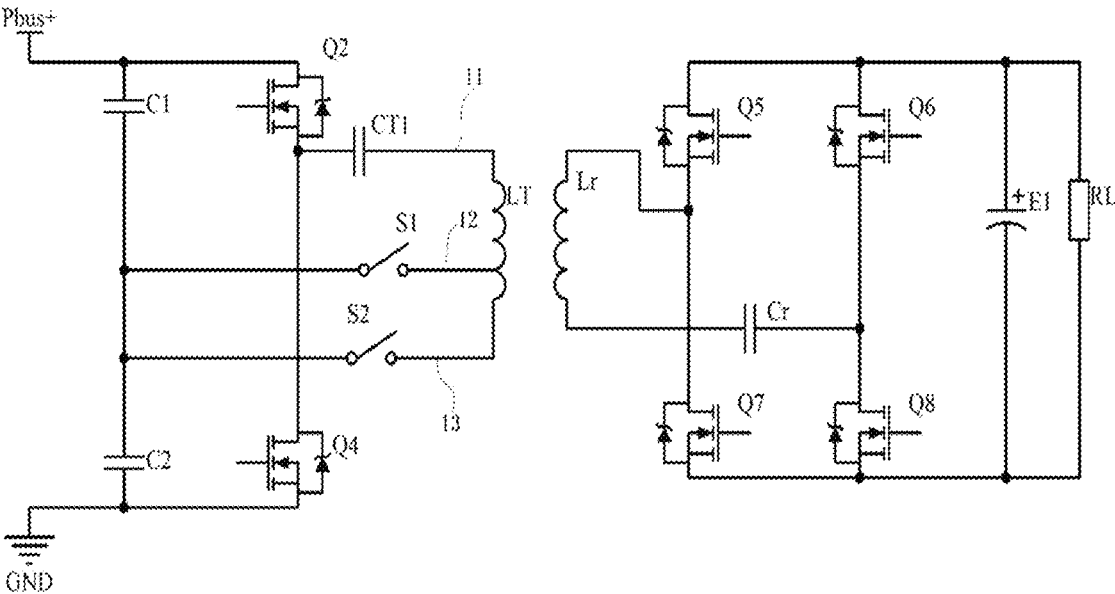
FIG. 2 is a structural schematic diagram of a partial circuit of another wireless power transmission system according to one or more embodiments of the disclosure.

In some embodiments, the transmitting end may include a first bridge circuit and a first coil electrically connected to the first bridge circuit. Referring to FIG. 1, in some embodiments, it can be understood that the first bridge circuit at the transmitting end may include a first power device Q1, a second power device Q2, a third power device Q3 and a fourth power device Q4. The first power device Q1 and the third power device Q3 are connected in series to form a first branch circuit. The second power device Q2 and the fourth power device Q4 are connected in series to form a second branch circuit. The first branch circuit and the second branch circuit are connected in parallel. A first end of the first coil LT is electrically connected between the second power device Q2 and the fourth power device Q4 through a first capacitor CT1. A second end of the first coil LT is electrically connected between the first power device Q1 and the third power device Q3. A function of an inverter circuit can be realized through the above structure. In addition, it can be understood that the first power device Q1 and the second power device Q2 may be replaced by a capacitor C1 and a capacitor C2 to form a half-bridge inverter circuit, which can achieve similar technical effects, as shown in FIG. 2. That is, a type of the bridge circuit in the disclosure is not limited.

In some embodiments, the first coil LT includes a transmitting detection coil and a transmitting work coil. The transmitting detection coil and the transmitting work coil may be completely independent, or may share some lines. A condition in which some lines are shared is taken as an example, as shown in FIG. 1, first ends of the transmitting detection coil and the transmitting work coil are all electrically connected between the second power device Q2 and the fourth power device Q4 through the first capacitor CT1. A second end of the transmitting detection coil is connected between the first power device Q1 and the third power device Q3 through a switch S1. A second end of the transmitting work coil is connected between the first power device Q1 and the third power device Q3 through a switch S2. The transmitting detection coil is configured to connect to a circuit when a foreign matter detection is performed between the transmitting end and the receiving end. The transmitting work coil is configured to connect to a circuit when an electrical energy is required to be transmitted normally to the receiving end after a foreign matter detection for metal is completed. A mutual inductance corresponding to the transmitting detection coil is greater than that of the transmitting work coil, to ensure that the wireless power transmission system can operate in a low-power and high-efficiency state when the foreign matter detection for the metal is performed, and thus an accuracy of the foreign matter detection is improved and it is ensured a smaller metal foreign matter can be detected in an application scenario of high-power transmission.

Referring to FIG. 1-FIG. 3, in some embodiments, the first coil LT includes a first lead 11, a second lead 12, and a third lead 13. The first lead 11 is electrically connected between the second power device Q2 and the fourth power device Q4 through a first capacitor CT1. The second lead 12 and the third lead 13 are electrically connected between the first power device Q1 and the third power device Q3 through the switch S1 and the switch S2, respectively. The first lead 11 may be led out from an end of the first coil LT located at a center thereof; the third lead 13 may be led out from an end of the first coil LT located at an edge thereof; and the second lead 12 may be led out from a middle portion of the first coil LT, as shown in FIG. 3. At this time, the first coil LT may be completely connected to the circuit through the first lead 11 and the third lead 13, and a maximum mutual inductance of the first coil LT can be achieved, and thus the first coil LT may be configured as a transmitting detection coil. A portion of the first coil LT close to the middle portion may be connected to the circuit as the transmitting work coil through the first lead 11 and the second lead 12 to achieve a high-power electricity transmission. Of course, in some embodiments, a mutual inductance of a coil between the second lead 12 and the third lead 13 may be designed to be larger, thereby connecting the second lead 12 and the third lead 13 to the circuit as a transmitting detection coil. In addition, more leads may be provided to segment the first coil LT to meet different detection requirements, which will not be described in detail herein.

It can be understood that when the first coil LT is designed, since the mutual inductance of the transmitting detection coil after being connected to the circuit is much greater than that of the transmitting work coil, the transmitting detection coil generally has low power when working. Therefore, a wire with a larger diameter may be used to make a coil portion between the first lead 11 and the second lead 12, and a wire with a smaller diameter may be used to make a coil portion between the second lead 12 and the third lead 13, thereby reducing a manufacturing cost without affecting a performance.

Likewise, it can be understood that the receiving end may include a second bridge circuit and a second coil Lr electrically connected to the second bridge circuit. As shown FIG. 1, in some embodiments, it can be understood that the above-mentioned second bridge circuit may include a fifth power device Q5, a sixth power device Q6, a seventh power device Q7 and an eighth power device Q8. The fifth power device Q5 and the seventh power device Q7 are connected in series to form a third branch circuit. The sixth power device Q6 and the eighth power device Q8 are connected in series to form a fourth branch circuit. The third branch circuit and the fourth branch circuit are connected in parallel. A first end of the second coil Lr is electrically connected between the fifth power device Q5 and the seventh power device Q7. A second end of the second coil Lr is electrically connected between the sixth power device Q6 and the eighth power device Q8 through a second capacitor Cr. A function of a rectifier circuit can be realized through the above structure.

In some embodiments, an energy storage module connected in parallel with the fourth branch circuit is also provided at the receiving end. The energy storage module is configured to charge and store energy when the foreign matter detection is performed, and to discharge to make the receiving end not to receive the electric energy transmitted by the transmitting end. It is understandable that the energy storage module may use a large-capacity capacitor, such as an electrolytic capacitor. Other components that can be configured to store the electric energy may also be used.

It should be noted that the power devices Q1, Q2, Q3, Q4, Q5, Q6, Q7, Q8, Q9, and Q10 may be any transistor of an IGBT (Insulated Gate Bipolar Transistor), a MOS tube, or a triode and so on.

Referring to FIG. 4, in some embodiments, a method for detecting a foreign matter for a wireless power transmission system is also provided, and the method includes:

Step S10: controlling the transmitting detection coil of the transmitting end to send electric energy to the receiving end and obtaining a transmitting power of the transmitting end;

Step S20: obtaining a receiving power when the receiving end receives the electric energy transmitted by the transmitting end; and Step S30: obtaining a result of a foreign matter detection based on the transmitting power and the receiving power.

Figure 5:
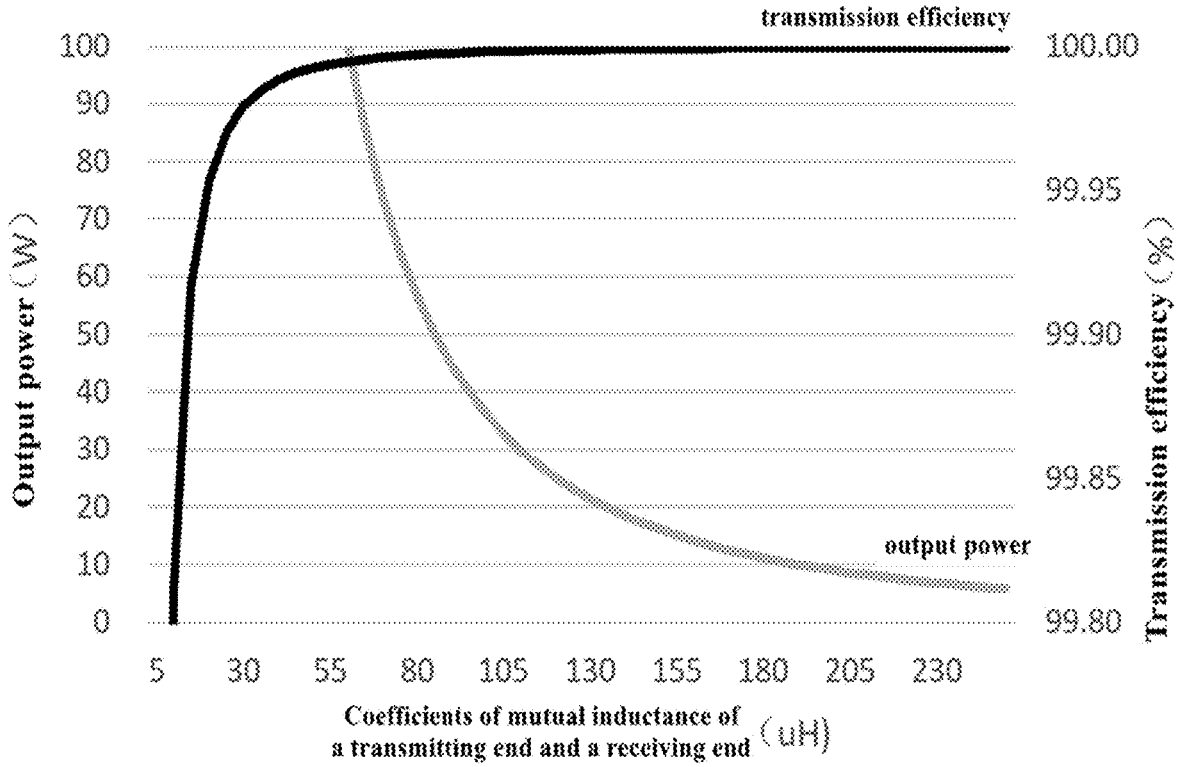
FIG. 5 is a schematic diagram showing a relationship among an output power, a transmission efficiency and a coefficient of mutual inductance according to one or more embodiments of the disclosure.

In some embodiments, when the foreign matter detection is performed through steps S10-S30, a dedicated transmitting detection coil is utilized to transmit electric energy to a wireless receiving end, and a mutual inductance of the transmitting detection coil is greater than that of the transmitting work coil, so that a lower transmitting power can be achieved in a process of the foreign matter detection, while a transmission efficiency of an entire wireless power transmission system can be improved, as shown in FIG. 5. While the transmitting power is reduced, the transmission efficiency is improved, so that a power consumed by a smaller metal foreign matter between the transmitting end and the receiving end can be amplified, thereby enabling a change in the transmitting power to more sensitively reflect whether there is the smaller metal foreign matter between the transmitting end and the receiving end. Therefore, an accuracy of the foreign matter detection can be improved, and thus the method for detecting the foreign matter can be effectively applied to detect the foreign matter in a scenario of a high-power wireless power transmission.

In Step S10: the transmitting detection coil of the transmitting end is controlled to send electric energy to the receiving end and a transmitting power of the transmitting end is obtained.

In step S10, a metal foreign matter detection may be performed before the electric energy is sent to a power consumption device. When the step S10 is performed, a relevant control signal may come from a controller of a device including the transmitting end, or from a controller in the power consumption device, or from an independent control module, which is not limited. The electric energy of the transmitting end may come from a mains supply, energy storage batteries, solar panels and so on, which is not limited.

It can be understood that the transmitting detection coil is wound in a disc shape and may include a first transmitting portion (as shown in FIG. 2 and FIG. 3, the coil portion between the first lead 11 and the second lead 12) and a second transmitting portion (as shown in FIG. 2 and FIG. 3, the coil portion between the second lead 12 and the third lead 13). The first transmitting portion and the second transmitting portion are connected in series, and the second transmitting portion surrounds an outside of the first transmitting portion. A first transmitting end lead (the third lead 13) is provided at an end of the transmitting detection coil, and a second transmitting end lead (the second lead 12) is provided between the first transmitting portion and the second transmitting portion. Before the transmitting detection coil of the transmitting end is controlled to send the electric energy to the receiving end, the second transmitting end lead can be disconnected and the first transmitting end lead can be connected, to disconnect the transmitting work coil from a circuit and connect the transmitting detection coil to the circuit for operation.

As shown in FIG. 2, when the wireless power transmission system needs to perform a high-power transmission, an excitation current of a circuit of the transmitting end is relatively large, and thus a too small metal foreign matter is difficult to be detected. At this time, the controller performing the method can send control signals to the switch S1 and switch S2 respectively, to control the switch S1 to be switched off and the switch S2 to be switched on, thereby connecting the transmitting detection coil to the circuit. The inverter circuit at the transmitting end operatively injects a high-frequency pulse into the transmitting detection coil of the first coil LT, to make the transmitting detection coil of the first coil LT to be in a resonance with the transmitting detection coil and the first capacitor CT1, and thus the transmitting detection coil of the first coil LT sends a wireless electric energy to outside. The second coil Lr, after receiving the wireless electric energy, injects a high-frequency alternating voltage and current into the second bridge circuit, i.e., a synchronous rectification full-bridge circuit. The synchronous rectification full-bridge circuit rectifies the high-frequency alternating voltage to generate a direct current to be output. The whole process, compared with that the transmitting work coil is connected, reduces the transmitting power and improves the transmission efficiency. It works as follows.

In the first coil LT, the number of turns $N_{T2}$ and an inductance $L_{T2}$ between the first lead 11 and the third lead 13 are both greater than the number of turns $N_{T1}$ and an inductance $L_{T1}$ between the first lead 11 and the second lead 12. According to formula (1), when a spacing d and a radius r of the coils remain unchanged, a coefficient of mutual inductance M between the coils increases with the number of turns $N_T$, $N_r$ of the coils.

$$M \approx \frac{\pi \mu_0 \sqrt{N_T N_r}\, r_T^2 r_r^2}{2d^3} \tag{1}$$

where, M is the coefficient of mutual inductance; $\mu_0$ is a magnetic permeability; $N_T$ and $N_r$ are the turns of the coils of the transmitting end and the receiving end respectively; $r_T$ and $r_r$ are radii of the coils of the transmitting end and the receiving end respectively; and d is a distance between the coil of the transmitting end and the coil of the receiving end. According to a relationship $M=\sqrt{L_m L_r}$ between a coefficient of mutual inductance M of a transformer and an excitation inductance Lm, where $L_m$, $L_r$ are the excitation inductances of the coil of the transmitting end and the coil of the receiving end respectively, it can be known that when the coefficient of mutual inductance M increases, the excitation inductance $L_m$ will increase and an excitation current will decrease. According to a wireless power transmission technology, when a series-and-series (S-S) topology is adopted (as shown in FIG. 1), a maximum output power and an output voltage of the transmitting end may be calculated using the following formulas (2) and (3):

$$P_{out} = \frac{V_{in}^2 R_L}{\left(\frac{R_T R_L}{\omega_o M} + \omega_o M\right)^2} \tag{2}$$

$$U_o = \frac{V_{in} R_L}{\omega_o M} \tag{3}$$

where, $V_{in}$ is an input voltage of a circuit for the wireless power transmission for the transmitting end; $R_L$ is a load impedance; $R_T$ is an internal resistance of a coil of the transmitting end; $\omega_o$ is an angular velocity of the circuit for the wireless power transmission for the transmitting end; $U_o$ is an output voltage of the transmitting end; and M is the coefficient of mutual inductance. From the above formulas (2) and (3), a characteristic diagram of the circuit for the wireless power transmission in FIG. 5 can be obtained. When the coefficient of mutual inductance M increases, a systematic transmission efficiency increases and the maximum output power decreases. It can be seen from the above conditions that when there is a foreign matter between two wireless power transmission apparatuses, the transmission efficiency will be reduced. In a state of detecting the foreign matter, if there is the foreign matter at this moment, a portion of energy wirelessly transmitted will be occupied due to a small excitation current and a small load power, thereby having a greater impact on an overall transmission efficiency. Therefore, in some embodiments, an accuracy of the foreign matter detection can be further improved by connecting a dedicated transmitting detection coil.

Figure 6:
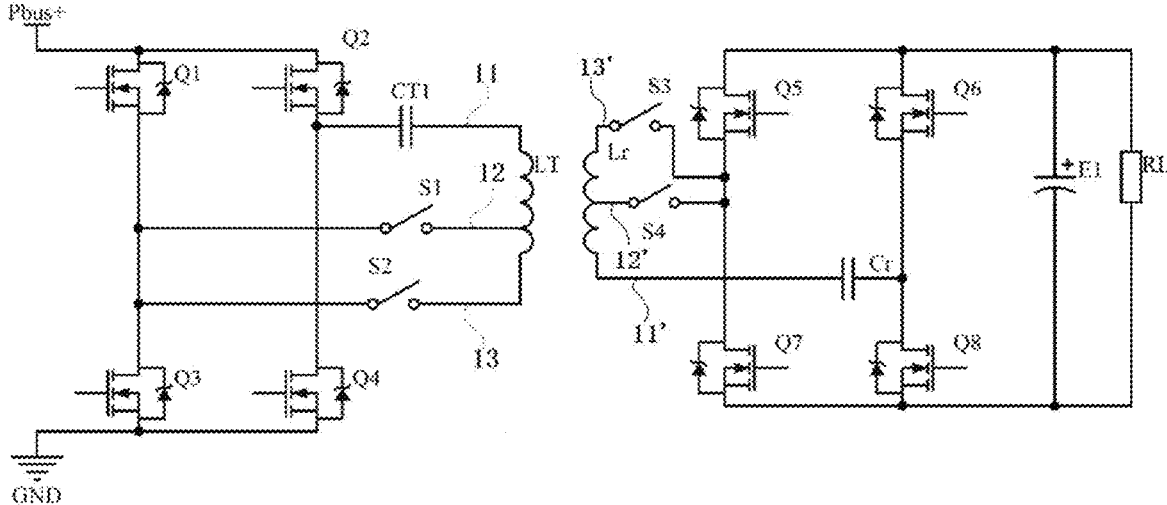
FIG. 6 is a structural schematic diagram of a partial circuit of another wireless power transmission system according to one or more embodiments of the disclosure.

Referring to FIG. 6, it can be understood that the second coil of the receiving end can also be provided with a receiving work coil and a receiving detection coil, a structure of which can be the same as or similar to that of the first coil. The receiving detection coil is wound in a disc shape, and includes a first receiving portion (as shown in FIG. 6, a coil portion between a lead 11' and a lead 12') and a second receiving portion (as shown in FIG. 6, a coil portion between the lead 12' and a lead 13'). The first receiving portion and the second receiving portion are connected in series, and the second receiving portion surrounds an outside of the first receiving portion. A first receiving end lead (the lead 13') is provided at an end of the receiving detection coil, and a second receiving end lead (the lead 12') is provided between the first receiving portion and the second receiving portion. Therefore, before the transmitting detection coil of the transmitting end is controlled to send the electric energy to the receiving detection coil of the receiving end, the second receiving end lead is disconnected and the first receiving end lead is connected, to disconnect the receiving work coil from a circuit and connect the receiving detection coil to the circuit for operation. As shown in FIG. 6, the receiving detection coil can be connected by switching on a switch S3 and switching off a switch S4. The receiving work coil can be connected by switching off the switch S3 and switching on the switch S4. The mutual inductance corresponding to the receiving detection coil is greater than the mutual inductance corresponding to the receiving work coil. Step S10, when performed, may include: controlling the transmitting detection coil of the transmitting end to send the electric energy to the receiving detection coil of the receiving end, thereby further increasing the mutual inductance and improving the accuracy of the foreign matter detection.

In Step S20: a receiving power is obtained when the receiving end receives the electric energy transmitted by the transmitting end;

In step S20, the receiving power of the receiving end may be obtained by calculating at the receiving end. If a controller performing the method for detecting the foreign matter and the receiving end do not belong to a same apparatus, the receiving power may be sent to the controller performing the method by a way of wireless transmission. In an embodiment, the receiving power may be sent to the controller performing the method through wireless communication methods such as Bluetooth, near field communication, and so on, which is not limited.

In Step S30: a result of a foreign matter detection is obtained based on the transmitting power and the receiving power.

In step S30, it can be understood that in some embodiments, a power difference between the transmitting power and the receiving power can be obtained. Then, the result of the foreign matter detection can be obtained based on the power difference and a preset deviation threshold.

In some embodiments, when the power difference is greater than the preset deviation threshold, it is indicated that there is a metal foreign matter between the transmitting end and the receiving end that consumes the transmitting power. At this moment, it can be determined that the result of the foreign matter detection is that there is the foreign matter. When the power difference is less than the preset deviation threshold, it is indicated that there is no metal foreign matter between the transmitting end and the receiving end that consumes the transmitting power. At this moment, it can be determined that the result of the foreign matter detection is that there is no foreign matter.

In some embodiments, the power difference value and the preset deviation threshold value may not be completely matched with each other due to the presence of errors. Therefore, an identification threshold may be introduced to compensate for the errors. Steps of performing the foreign matter detection according to the power difference value and the preset deviation threshold value are as follows: determining whether a difference between the power difference and the preset deviation threshold is greater than a preset identification threshold; if the difference between the power difference and the preset deviation threshold is greater than the identification threshold, it is indicated that there is a metal foreign matter between the transmitting end and the receiving end; and therefore, it can be determined that the result of the foreign matter detection is that there is the foreign matter. If the difference between the power difference and the preset deviation threshold is not greater than the identification threshold, it can be determined that the result of the foreign matter detection is that there is no foreign matter. In order to improve a reliability of the result of the foreign matter detection, step S10-step S30 may be performed cyclically until the result of the foreign matter detection indicating a presence of the foreign matter is obtained; or if step S10-step S30 are performed cyclically for a preset number of times or a preset duration, it is considered that a result of the foreign matter detection indicating an absence of the foreign matter is obtained. It can be understood that in a condition that the difference between the power difference and the preset deviation threshold is greater than the preset identification threshold, the result of the foreign matter detection is determined to be the presence of foreign matter. When the difference between the power difference and the preset deviation threshold is not greater than the preset identification threshold, and the preset number of times or the preset duration reaches for the foreign matter detection, it is considered that the result of the foreign matter detection indicating the absence of the foreign matter is obtained. In such way, an inaccurate detection caused by minor fluctuations can be avoided. For example, if the transmitting end and receiving end when coupled each time cannot be consistent, there may be a small coupling error. An error of the foreign matter detection can be eliminated as much as possible to improve the accuracy of the foreign matter detection by setting the identification threshold to compensate for the preset deviation threshold.

The preset number of times or preset duration can be customized. In some embodiments, the preset number of times may be 5 times, 6 times, 8 times and so on, and the preset duration may be 5 μs, 8 μs, 10 μs and so on. In addition, the preset number of times or the preset duration may be set to be larger in a scenario where a power of an electricity transmission is greater, thereby improving a reliability.

It is understandable that in other embodiments, the result of the foreign matter detection may also be determined by a change in the transmission efficiency. A performing process for determining the result of the foreign matter detection by the change in the transmission efficiency is: obtaining the transmission efficiency between the transmitting end and the receiving end based on the transmitting power and the receiving power; and obtaining the result of the foreign matter detection based on the transmission efficiency and a preset efficiency threshold. If the transmission efficiency is less than the efficiency threshold, it is indicated that there is a metal foreign matter consuming the transmitting power between the transmitting end and the receiving end, and thus it can be determined that the result of the foreign matter detection is that there is the foreign matter; otherwise, it can be determined that the result of the foreign matter detection is that there is no foreign matter.

It will be appreciated that a plurality of foreign matter detections may also be performed to determine that the result of the foreign matter detection is that there is no foreign matter, to increase a reliability and accuracy of the result of the foreign matter detection. In some embodiments, when the result of the foreign matter detection indicating an absence of the foreign matter is obtained based on the transmission efficiency and the preset efficiency threshold, step S10-step S30 may be performed cyclically until the result of the foreign matter detection indicating a presence of the foreign matter is obtained; or if step S10-step S30 are performed cyclically for a preset number of times or a preset duration, it is considered that a result of the foreign matter detection indicating an absence of the foreign matter is obtained.

In addition, an identification error amount may be introduced to compensate for an influence of external factors on a process of the foreign matter detection. In some embodiments, a difference (referred to as an efficiency difference for easy distinction) between the transmission efficiency and the efficiency threshold is compared with the identification error amount. When the efficiency difference is greater than the recognition error amount, it is indicated that there is no metal foreign matter between the transmitting end and the receiving end; otherwise, it is determined that there is the metal foreign matter between the transmitting end and the receiving end. It can be understood that in some embodiments, a plurality of foreign matter detections may also be performed to determine that the result of the foreign matter detection is that there is no foreign matter, to increase a reliability and accuracy of the result of the foreign matter detection. That is, when the result of the foreign matter detection is that there is no foreign matter, the step S10-step S30 may continue performing cyclically until the result of the foreign matter detection indicating a presence of the foreign matter is obtained; or if step S10-step S30 are performed cyclically for a preset number of times or a preset duration, it is considered that a result of the foreign matter detection indicating an absence of the foreign matter is obtained.

It should be noted that, in an embodiment that the transmission efficiency is used as a basis for the foreign matter detection, the transmission efficiency is a ratio that characterizes a difference between the transmitting power and the receiving power. In an embodiment that the power difference is used as a basis for the foreign matter detection, the power difference is an absolute data quantity that characterizes the difference between the transmitting power and the receiving power. A better result of the foreign matter detection can be obtained by setting a smaller preset deviation threshold or identification threshold.

In summary, with a method for detecting a foreign matter for a wireless power transmission system according to the embodiments of the disclosure, a dedicated transmitting detection coil may be connected when the foreign matter is detected. Since the transmitting detection coil has a larger mutual inductance than the transmitting work coil, the transmitting power can be reduced and the transmission efficiency can be improved. Thus an influence of the metal foreign matter on the receiving power is amplified, thereby realizing a detection for the metal foreign matter between the transmitting end and the receiving end under low power condition, and improving the accuracy of the foreign matter detection. The method can be effectively applied to detect small metal foreign matter in a scenario of a high-power wireless power transmission, for example, the method can be effectively applied in a scenario of the high-power wireless power transmission above 100 W.

Figure 7:
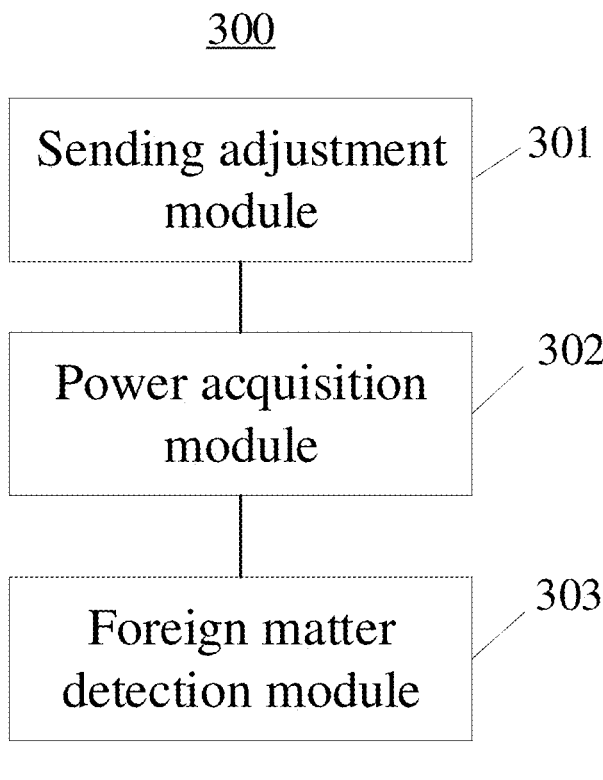
FIG. 7 is a structural schematic diagram of a device for detecting a foreign matter for a wireless power transmission system of a household appliance according to one or more embodiments of the disclosure.

Referring to FIG. 7, in some embodiments of the disclosure, a device 300 for detecting a foreign matter for a wireless power transmission system is further provided. The wireless power transmission system includes a transmitting end and a receiving end. The transmitting end includes a transmitting detection coil and a transmitting work coil. A mutual inductance corresponding to the transmitting detection coil is greater than a mutual inductance corresponding to the transmitting work coil. The device 300 for detecting a foreign matter includes: a sending adjustment module 301, configured to control the transmitting detection coil of the transmitting end to send electric energy to the receiving end and obtain a transmitting power of the transmitting end; a power acquisition module 302, configured to obtain a receiving power when the receiving end receives the electric energy transmitted by the transmitting end; and a foreign matter detection module 303, configured to obtain a result of a foreign matter detection based on the transmitting power and the receiving power.

In some embodiments, the foreign matter detection module 303 includes: a power difference acquisition unit, configured to obtain a power difference between the transmitting power and the receiving power; and a first detection unit, configured to obtain the result of the foreign matter detection based on the power difference and a preset deviation threshold.

In some embodiments, the first detection unit includes a first detection subunit, which is configured to: determine whether a difference between the power difference and the preset deviation threshold is greater than the preset identification threshold; determine that the result of the foreign matter detection is that there is a foreign matter, if the difference between the power difference and the preset deviation threshold is greater than the preset identification threshold; and if a difference between the power difference and the preset deviation threshold is not greater than the preset identification threshold, then cyclically perform the controlling the transmitting detection coil of the transmitting end to send electric energy to the receiving end and obtaining the transmitting power of the transmitting end, the obtaining the receiving power when the receiving end receives the electric energy transmitted by the transmitting end, and the obtaining the result of the foreign matter detection based on the transmitting power and the receiving power, until the result of the foreign matter detection indicating a presence of a foreign matter is obtained, or obtain a result of a foreign matter detection indicating an absence of a foreign matter, if the controlling the transmitting detection coil of the transmitting end to send electric energy to the receiving end and obtaining the transmitting power of the transmitting end, the obtaining the receiving power when the receiving end receives the electric energy transmitted by the transmitting end and the obtaining the result of the foreign matter detection based on the transmitting power and the receiving power are cyclically performed for a preset number of times or a preset duration.

In some embodiments, the foreign matter detection module 303 includes a second detection unit, which is configured for: obtaining a transmission efficiency between the transmitting end and the receiving end based on the transmitting power and the receiving power; and obtaining the result of the foreign matter detection based on the transmission efficiency and a preset efficiency threshold.

In some embodiments, the receiving end includes a receiving detection coil and a receiving work coil; a mutual inductance corresponding to the receiving detection coil is greater than a mutual inductance corresponding to the receiving work coil; the sending adjustment module 301 includes an adjustment submodule, which is configured to: control the transmitting detection coil of the transmitting end to send electric energy to the receiving detection coil of the receiving end.

In some embodiments, the receiving detection coil is wound in a disc shape and includes a first receiving portion and a second receiving portion. The first receiving portion and the second receiving portion are connected in series, and the second receiving portion is wrapped around an outside of the first receiving portion. A first receiving end lead is provided at an end of the receiving detection coil, and a second receiving end lead is provided between the first receiving portion and the second receiving portion. The sending adjustment module 301 is also configured to disconnect the second receiving end lead and connect the first receiving end lead before the transmitting detection coil of the transmitting end is controlled to send the electric energy to the receiving detection coil of the receiving end, to disconnect the receiving work coil from a circuit and connect the receiving detection coil to the circuit for operation.

In some embodiments, the transmitting detection coil is wound in a disc shape and includes a first transmitting portion and a second transmitting portion. The first transmitting portion and the second transmitting portion are connected in series. The second transmitting portion is wrapped around an outside of the first transmitting portion. A first transmitting end lead is provided at an end of the transmitting detection coil, and a second transmitting end lead is provided between the first transmitting portion and the second transmitting portion. The sending adjustment module 301 is also configured to disconnect the second transmitting end lead and connect the first transmitting end lead before the transmitting detection coil of the transmitting end is controlled to send the electric energy to the receiving end, to disconnect the transmitting work coil from a circuit and connect the transmitting detection coil to the circuit for operation.

The device disclosed in the embodiments of the device introduced above can be configured to perform the method for detecting the foreign matter of the wireless power transmission system in the above embodiment of the disclosure. For details not disclosed in the embodiments of the device introduced in the embodiment of the disclosure, please refer to the embodiments of the method for detecting the foreign matter of the wireless power transmission system in the above embodiments of the disclosure.

In some embodiments of the disclosure, a wireless power transmission apparatus is also provided, including: a transmitting end configured to wirelessly transmit electric energy, at least one hardware processor and a memory. The transmitting end includes a transmitting detection coil and a transmitting work coil. A mutual inductance corresponding to the transmitting detection coil is greater than a mutual inductance corresponding to the transmitting work coil. The memory is coupled to the processor, and the memory stores instructions. The instructions, when executed by the processor, causes the wireless power transmission apparatus to implement steps of any one of the embodiments of the method described in the foregoing embodiments of the method.

In some embodiments of the disclosure, a method for detecting a foreign matter for a wireless power transmission system is also provided. The wireless power transmission system includes a transmitting end and a receiving end. The receiving end includes a receiving detection coil and a receiving work coil, and a mutual inductance corresponding to the receiving detection coil is greater than a mutual inductance corresponding to the receiving work coil. The method includes: controlling the receiving detection coil of the receiving end to receive electric energy transmitted by the transmitting end and obtaining a receiving power; obtaining a transmitting power when the transmitting end sends the electric energy; and obtaining a result of a foreign matter detection based on the transmitting power and the receiving power. The steps in this method, which are the same as those in the aforementioned embodiments for the method, can be performed with reference to the aforementioned embodiments for the method and will not be described in detail.

In some embodiments of the disclosure, a household appliance is also provided, including: a receiving end configured to wirelessly receive electric energy, at least one hardware processor and a memory. The receiving end includes a receiving detection coil and a receiving work coil. A mutual inductance corresponding to the receiving detection coil is greater than a mutual inductance corresponding to the receiving work coil. The memory is coupled to the processor, and the memory stores instructions. The instructions, when executed by the processor, cause the wireless power transmission apparatus to implement the following steps: controlling the receiving detection coil of the receiving end to receive electric energy transmitted by the transmitting end and obtain a receiving power; obtaining a transmitting power when the transmitting end sends the electric energy; and obtaining a result of a foreign matter detection based on the transmitting power and the receiving power.

In some embodiments of the disclosure, an air conditioning system is also provided, including: a wireless charger and an air conditioner. The wireless charger comprises: a transmitting end configured to wirelessly transmit electric energy. The air conditioner comprises a receiving end configured to wirelessly receive the electric energy. The air conditioning system is configured to perform any of the methods described in the aforementioned embodiments. In some embodiments, the air conditioner may be a mobile air conditioner, a dehumidifier, a dryer and so on.

It should be noted that, regarding the wireless power transmission apparatus, household appliances and air conditioning system provided by the disclosure, a controlling of the transmitting end and/or the receiving end when realizing a function of the metal foreign matter detection or realizing related functions may be referred to contents of the aforementioned embodiments of the method and will not be repeated here.

The functions described herein may be implemented in a hardware, a software performed by a processor, a firmware, or any combination thereof. An implementation process of the functions, if implemented in the software performed by the processor, may be stored on or transmitted over a computer-readable medium as one or more instructions or codes. Other embodiments and implementations are within the scope and spirit sought by the disclosure and the appended claims. For example, the functions described above may be implemented by using software performed by a processor, a hardware, a firmware, a hardwiring, or a combination of any of these due to a nature of software. In addition, each functional unit may be integrated into one processing unit, or each functional unit may be an independent unit existing physically, or two or more units may be integrated into one unit.

In the several embodiments provided in the disclosure, it should be understood that the disclosed technical contents can be implemented in other ways. The embodiments of the device described above are only schematic. For example, the division of the units can be a logical function division. There may be other division methods in actual implementation. For example, a plurality units or components may be combined or integrated into another system, or some features may be ignored or not performed. Another point is that the mutual coupling or direct coupling or communication connection shown or discussed may be an indirect coupling or communication connection through some interfaces, units or modules, which may be in the electrical form or other forms.

The units described as separate components may or may not be physically separated, and the components acting as the control device may or may not be physical units, that is, the components may be located in one place or distributed in a plurality of units. Some or all units may be selected according to actual needs to achieve the purpose of the solution of the embodiments.

If the integrated unit is implemented in the form of a software functional unit and sold or used as an independent product, it can be stored in a computer-readable storage medium. Based on such understanding, the essence or the portion that contributes to the related art of the technical solution of the disclosure, or some or all the technical solutions of the disclosure can be embodied in the form of a software product. The computer software product is stored in a storage medium and includes a number of instructions for enabling a computer device (which may be a personal computer, a server or a network device and so on) to perform all or part of the steps of the method described in each embodiment of the disclosure. The aforementioned storage media include: U disk, read-only memory (ROM), random access memory (RAM), mobile hard disk, magnetic disk or optical disk and other media and so on that can store program codes.

The above descriptions are merely embodiments of the disclosure and are not intended to limit the disclosure. For those skilled in the art, the disclosure may have various modifications and changes. Any modifications, equivalent substitutions, improvements and so on made within the spirit and principles of this disclosure should be included in the scope sought by the claims of this disclosure.

What is claimed is:

1. A method for detecting whether a foreign matter is present within a wireless power transmission system, the method comprising:
   controlling a transmitting detection coil of a transmitting end of the wireless power transmission system to send electric energy to a receiving end of the wireless power transmission system, wherein a mutual inductance between the transmitting detection coil and the receiving end is greater than a mutual inductance between a transmitting work coil of the transmitting end and the receiving end;
   determining a transmitting power of the electric energy provided by the transmitting end;

determining a receiving power received by the receiving end;

determining a power difference between the transmitting power and the receiving power; and determining whether the foreign matter is present based on whether the power difference surpasses a threshold.

2. The method according to claim 1, wherein the determining whether the foreign matter is present based on whether the power difference surpasses a threshold comprises:

obtaining the result of the foreign matter detection indicating a presence of determining that the foreign matter is present responsive to determining that the power difference surpasses the threshold; and determining that the foreign matter is not present responsive to determining that the power difference does not surpass the threshold.

3. The method according to claim 1, further comprising determining a transmission efficiency between the transmitting end and the receiving end based on the power difference, wherein the determining whether the foreign matter is present is based on the transmission efficiency.

4. The method according to claim 1, wherein:

the receiving end comprises a receiving detection coil and a receiving work coil;

a mutual inductance between the receiving detection coil and the transmitting end is greater than a mutual inductance between the receiving work coil and the transmitting end; and the controlling the transmitting detection coil to send the electric energy to the receiving end comprises controlling the transmitting detection coil to send the electric energy to the receiving detection coil.

5. The method according to claim 4, wherein:

the receiving detection coil is wound in a disc shape and comprises a first receiving portion and a second receiving portion;

the first receiving portion and the second receiving portion are connected in series;

the second receiving portion is wrapped around an outside of the first receiving portion;

a first receiving end lead is provided at an end of the receiving detection coil;

a second receiving end lead is provided between the first receiving portion and the second receiving portion; and the method further comprises, prior to controlling the transmitting detection coil to send the electric energy to the receiving detection coil disconnecting the second receiving end lead from a circuit and connecting the first receiving end lead to the circuit effective to disconnect the receiving work coil from the circuit and connect the receiving detection coil to the circuit.

6. The method according to claim 1, wherein:

the transmitting detection coil is wound in a disc shape and comprises a first transmitting portion and a second transmitting portion;

the first transmitting portion and the second transmitting portion are connected in series;

the second transmitting portion being is wrapped around an outside of the first transmitting portion;

a first transmitting end lead is provided at an end of the transmitting detection coil;

a second transmitting end lead is provided between the first transmitting portion and the second transmitting portion; and the method further comprises, prior to controlling the transmitting detection coil to send the electric energy to the receiving end, disconnecting the second transmitting end lead from a circuit and connecting the first transmitting end lead to the circuit effective to disconnect the transmitting work coil from the circuit and connect the transmitting detection coil to the circuit.

7. A device for detecting whether a foreign matter is present within a wireless power transmission system, the device comprising:

a transmission adjustment module configured to control a transmitting detection coil of a transmitting end of the wireless power transmission system to send electric energy to a receiving end of the wireless power transmission system and determine a transmitting power of the transmitting end;

a power acquisition module configured to obtain a receiving power received by the receiving end; and a foreign matter detection module configured to:

determine a power difference between the transmitting power and the receiving power; and determine whether the foreign matter is present based on whether the power difference surpasses a threshold.

8. A wireless power transmission apparatus comprising: a transmitting end configured to wirelessly transmit electric energy, at least one processor and a memory, wherein, the transmitting end comprises a transmitting detection coil and a transmitting work coil, a mutual inductance corresponding to the transmitting detection coil being greater than a mutual inductance corresponding to the transmitting work coil;

the memory is coupled to the at least one processor, and stores instructions; and the instructions, when executed by the at least one processor, cause the wireless power transmission apparatus to implement the method according to claim 1.

9. An air conditioning system comprising:

a wireless charger and an air conditioner, the wireless charger comprising a transmitting end configured to wirelessly transmit electric energy, the air conditioner comprising a receiving end configured to wirelessly receive the electric energy, wherein the air conditioning system is configured to implement the method according to claim 1.

10. A method for detecting whether a foreign matter is present within a wireless power transmission system, the method comprising:

receiving, via a receiving detection coil of a receiving end of the wireless power transmission system, energy from a transmitting end of the wireless power transmission system, wherein a mutual inductance between the receiving detection coil and the transmitting end is greater than a mutual inductance between a receiving work coil of the receiving end and the transmitting end;

determining a receiving power received by the receiving detection coil;

determining a transmitting power of the energy provided by the transmitting end sends the electric energy;

determining a power difference between the transmitting power and the receiving power; and determining whether the foreign matter is present based on whether the power difference surpasses a threshold.

11. A household appliance comprising: a receiving end configured to wirelessly receive electric energy, at least one processor and a memory, wherein the receiving end comprise a receiving detection coil and a receiving work coil, a mutual inductance corresponding to the receiving detection coil being greater than a mutual inductance corresponding to the receiving work coil;

the memory is coupled to the at least one processor, and stores instructions; and the instructions, when executed by the at least one processor, cause the wireless power transmission apparatus to implement the method according to claim 10.

12. The method according to claim 1, wherein the determining whether the foreign matter is present based on whether the power difference surpasses a threshold comprises:

determining that the foreign matter is present responsive to determining that the power difference surpasses the threshold; and determining that the foreign matter is not present responsive to determining that the power difference does not surpass the threshold for a number of iterations or an elapsed time.

\* \* \* \* \*